C. L. CRAIG.
NUT LOCK.
APPLICATION FILED APR. 26, 1916.
1,216,952.
Patented Feb. 20, 1917.
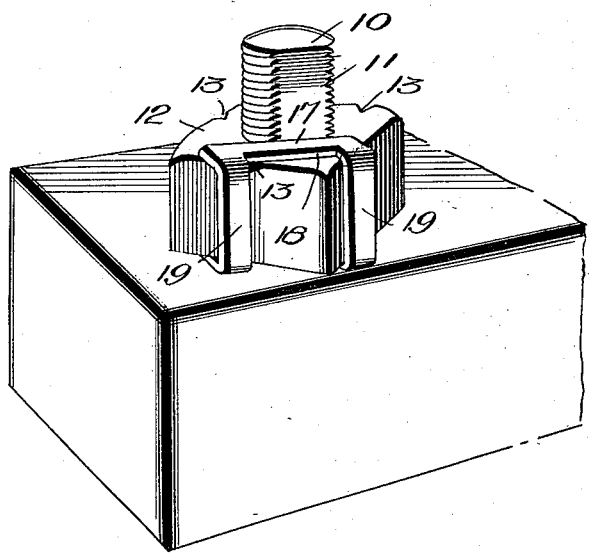
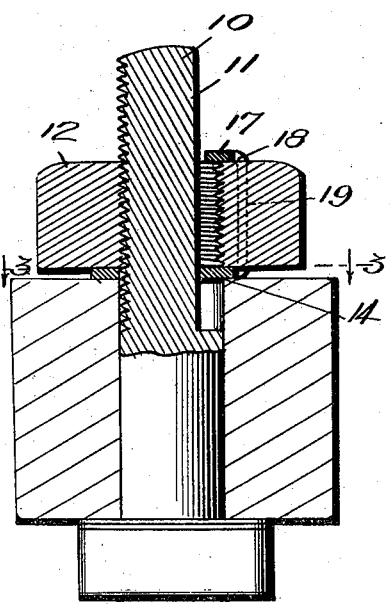
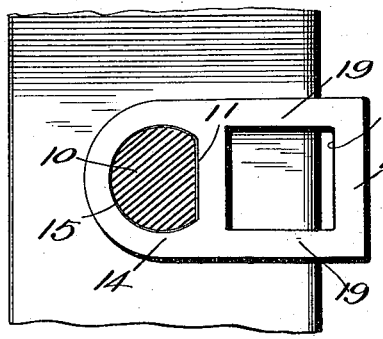
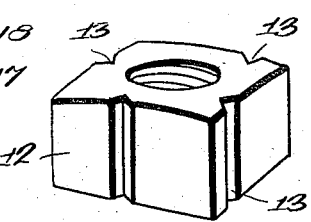
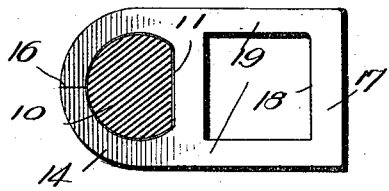
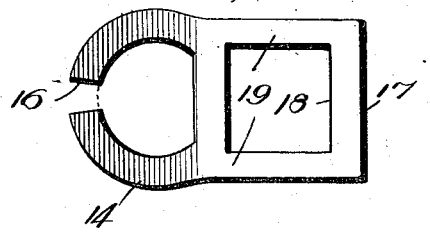
WITNESSES:
INVENTOR
Clyde L. Craig
BY
ATTORNEYS

UNITED STATES PATENT OFFICE.

CLYDE L. CRAIG, OF WASHINGTON COURT-HOUSE, OHIO.

NUT-LOCK.

1,216,952.  Specification of Letters Patent.  Patented Feb. 20, 1917.

Application filed April 26, 1916. Serial No. 93,673.

*To all whom it may concern:*

Be it known that I, CLYDE L. CRAIG, a citizen of the United States, and a resident of Washington Court-House, in the county of Fayette and State of Ohio, have invented a certain new and useful Improvement in Nut-Locks, of which the following is a specification.

My present invention relates generally to nut locks, and more particularly to a nut lock consisting of a nut engaging, bolt carried washer, my object being to provide a washer capable of quick and ready manipulation to effectively engage and hold a nut irrespective of the particular position of the latter with respect to the bolt.

A further object is to provide a nut locking washer of the above type, capable of use with bolts of different diameters and of clamping engagement with such bolts.

In the accompanying drawing illustrating my invention:

Figure 1 is a perspective view illustrating the practical application thereof.

Fig. 2 is a vertical sectional view.

Fig. 3 is a horizontal sectional view taken substantially on line 3—3 of Fig. 2.

Fig. 4 is a similar view illustrating a slightly modified form in which the washer is positively clamped in engagement with the bolt.

Fig. 5 is a detail plan view of the washer shown in Fig. 4, and

Fig. 6 is a detail perspective view of the nut removed.

Referring now to these figures, my improvements are utilized in connection with a bolt such as shown at 10 in Figs. 1 and 2 having a longitudinal flat face 11, and upon which is threaded a nut 12, which may for purposes to be presently described, be provided with a series of grooves 13 transversely of its side faces, the nut being polygonal, and paralleling the edges between the said side faces of the nut as seen in Fig. 6.

In connection with the nut and bolt so constructed, I provide a washer 14 having an aperture 15 flat on one side to receive the bolts 10 in non-rotatable relation, and which may be split as indicated at 16 in Figs. 4 and 5, so as to receive bolts of the shape described, although of varying diameters, and to clampingly engage the bolts by compressing the split portions of the washer, as by turning the same upon its edge and striking one side with a hammer.

The washer 14 so engaged with the bolts is provided with an extension 17 integral therewith and bendable into engagement with the nut 12, either with the flat side faces of the nut or with the corners thereof, the extension being for this purpose in the form of an open frame, of which the opening as seen at 18 is of a length greater than the thickness of the nut so as to receive therethrough one corner of the nut if necessary as shown in Fig. 1, the opening 18 forming side strips 19 engageable within the grooves 13 of the nut.

It is obvious, therefore, that the extension of my improved washer constructed as shown and described, is capable of ready manipulation and effective engagement with the nut 12 irrespective of the particular angularity of the latter with respect to the bolts 10 and the washer, and when so engaged operates to prevent movement of the nut relatively to the bolt and consequent turning off thereof.

It is also obvious that with the split form as shown in Figs. 4 and 5, the washer is adaptable to bolts of different diameters and capable of clamping engagement with such bolts, as seen in Fig. 4.

I claim:—

1. The combination with a bolt having a flat face and a nut threaded thereon, of a washer having an aperture slot at one side to receive the bolt and having a projecting extension of open framelike form, bendable into engagement with either the flat face or a corner of the nut, and the opening of which extension is of a length greater than the thickness of the nut.

2. The combination with a bolt having a flat face and a nut threaded thereon, of a washer having an aperture slot at one side to receive the bolt and split to clampingly engage bolts of different diameters, said washer having an integral open framelike extension bendable to engage the nut irrespective of the angular position of the latter with relation to the bolt.

3. The combination with a bolt and a nut threaded thereon, having side faces provided with transverse grooves paralleling the edges between said side faces, of a washer having an aperture to receive the bolt in non-rotatable relation and having an extension bendable into engagement with the faces of the nut, provided with an opening to receive the corners of the nut, and side strips engageable within the said grooves of the nut.

4. The combination with a bolt and a nut threaded thereon, of a washer having an aperture to receive the bolt in non-rotatable relation and split to clampingly engage bolts of different diameters, said washer having an integral open framelike extension at one side opposite the split portion thereof and bendable to engage the flat faces and receive the corners of the said nuts.

CLYDE L. CRAIG.

Copies of this patent may be obtained for five cents each, by addressing the "Commissioner of Patents, Washington, D. C."